Patented Dec. 25, 1928.

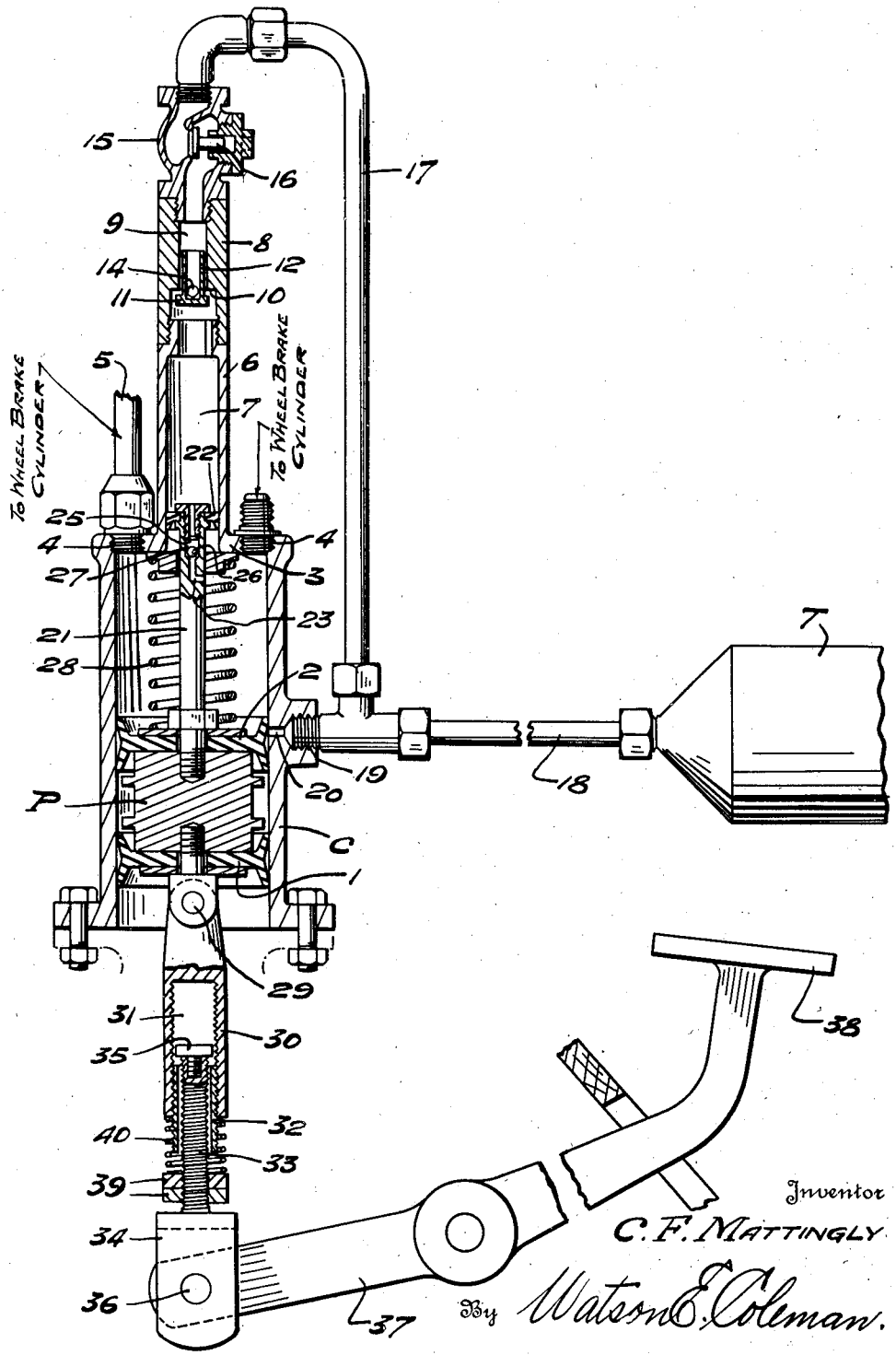

1,696,721

UNITED STATES PATENT OFFICE.

CHARLES F. MATTINGLY, OF ST. LOUIS, MISSOURI, ASSIGNOR TO MATTINGLY AUTOMATIC VALVE COMPANY, OF ST. LOUIS, MISSOURI, A CORPORATION OF MISSOURI.

MASTER CYLINDER FOR HYDRAULIC BRAKES.

Application filed June 7, 1927. Serial No. 197,086.

This invention relates to improvements in master cylinders for hydraulic brakes and has relation more especially to a cylinder of this kind of a self-filling or compensating type, and it is an object of the invention to provide means for forcing fluid under pressure into the braking system in a manner to preclude possibility of air entering into the system through leaking packings.

The invention also has for an object to provide means to maintain a predetermined pressure upon the fluid in the system and to permit bypassing back into the supply tank of excess pressure and fluid.

The invention consists in the details of construction and in the combination and arrangement of the several parts of my improved master cylinder for hydraulic brakes whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein is illustrated a view partly in elevation and partly in section and of somewhat a diagrammatic character illustrating a master cylinder constructed in accordance with an embodiment of my invention.

As disclosed in the accompanying drawing, C denotes a cylinder or casing of requisite dimensions in the bore of which is arranged a piston P provided at its opposite ends with the packings 1 and 2 having close contact with the wall of the bore of the cylinder C.

The permanent head 3 of the cylinder C is provided with outlet ports 4 with each of which is operatively engaged a pipe line 5 leading to a brake cylinder. As the particular type of brake cylinder and brake mechanism proper forms no part of the present invention it is not believed that a detailed disclosure is necessary.

Leading from the central portion of the permanent head 3 and integrally formed or otherwise connected thereto is an elongated cylinder extension 6 having its bore 7 in communication with the bore of the cylinder C. Threaded or otherwise coupled to the outer end portion of the cylinder extension 6 is a tubular member 8 having the outer portion of its bore 9 reduced providing an internal shoulder 10. This shoulder 10 provides a seat for a valve member 11 provided with a tubular or hollow stem 12, the wall of said stem 12 immediately adjacent to the valve member 11 being provided with an opening or port 14 which affords communication with the inner or enlarged portion of the bore 9 of the member 8 when the valve member 11 is unseated.

The stem 12 is disposed toward the outer end of the member 8 and suitably coupled to said outer end portion of the member 8 is a valve casing 15 in which is mounted a check valve 16 which seats when the piston P is on its pressure stroke.

Leading from the casing 15 is a pipe line 17 leading to and in communication with the pipe line 18 leading from a supply tank T. This pipe line 18 is suitably coupled to the wall of the cylinder C, as at 19, and is in communication with the bore of the cylinder C through the medium of the port 20.

Carried by the inner end portion of the piston P and arranged at the axial center thereof is an elongated rod 21 which is of a length to have its outer end portion at all times arranged within the bore 7 of the cylinder extension 6, said outer end portion of the rod 21 having mounted thereon a packing 22 for close contact with the wall of said bore 7.

The outer end of the rod 21 is provided with a bore 23 extending inwardly thereof a predetermined distance and opening through the side of said rod at a desired point inwardly thereof. This bore 23 is provided with an internal valve seat 25 with which coacts a ball valve 26 which engages its seat 25 when the piston P is on its outward or release stroke.

The rod 21 is freely disposed through a disc 27 positioned within the bore of the cylinder C and of a diameter to have requisite contact with the head 3 of the cylinder. Surrounding the rod 21 and interposed between the inner end of the piston P and the disc 27 is an expansible member 28, herein disclosed as a coil spring, encircling the rod 21 and of a predetermined tension.

The end of the cylinder remote from the head 3, as herein disclosed, is open and operatively engaged with the piston P, as at 29, through said open end of the cylinder is a rod 30 the outer end portion of which is provided with a bore 31. Threaded within the bore 31 is a sleeve 32 and extending freely through said sleeve 32 is a shank 33 carried by a yoke 34. The shank 33 is of a length materially greater than that of the sleeve 32 and extends entirely therethrough, the outer or inserted end portion of the shank having engaged therewith a head or button 35 of a diameter to have contact with the inserted end of the sleeve 32 upon requisite outward movement of the shank 33.

The yoke 34 is pivotally engaged, as at 36, with an end portion of a lever 37 adapted to be operated from the pedal 38 or the like. Threaded upon the shank 33 between the sleeve 32 and the yoke 34 are the nuts 39 and interposed between the nuts 39 and the outer end of the stem 30 is an expansible member 40 of requisite tension and herein disclosed as a coil spring encircling the shank 33 and the outer end portion of the applied sleeve 32.

Assuming that the system is fully charged with liquid and the supply tank T is also filled, the compression of the pedal 38 will force the shank 33 inwardly against the tension of the spring 40 until a nut 39 contacts with the outer end of the sleeve 32 whereupon continued depression of the pedal 38 will result in an inward or pressure stroke of the piston P through the medium of the stem 30. This movement of the piston P will compress the spring 28 and at the same time displace the fluid ahead of the piston P out through the ports 4 to the wheel brake cylinders (not shown). During this stroke of the piston P the ball valve 25 unseats and allows the fluid in the bore 7 of the extension 6 to bypass into the bore of the cylinder C due to the fact that during this stroke of the piston P the valve 11 is seated.

When pressure is relieved from the pedal 38, the spring 40 will expand, withdrawing the shank 33 outwardly from the bushing or sleeve 32 until the head or button 35 comes into contact with the inner end of the sleeve 32. At the same time the spring 28 will force the piston P back to rest position. When the piston P begins its backward movement, the ball valve 26 will move to its seat 25 closing the communication between the bore 7 of the extension 6 and the bore of the cylinder C. This causes a suction to be created in the bore 7 which in turn permits the fluid in the pipe line 17 to raise or unseat the valve 16 and to unseat the valve 11 and to enter the bore 7. As the pipe line 17 is in communication with the tank T, it is obvious that a fresh supply of fluid is drawn into the bore 7 on each back stroke of the piston P and bypassed into the cylinder C on each forward stroke of the piston, thus retaining a predetermined pressure on the fluid in the cylinder C and in the pipe lines and wheel cylinders associated therewith.

The nuts 39 and the sleeve or bushing 32 are adjusted so as to cause the packing 2 to overlap the port 20, thus closing communication between the bore of the cylinder C and the tank T until the pressure in the cylinder becomes slightly greater than the tension of the spring 40. When this condition occurs the piston P will be forced outwardly until the packing 2 uncovers the port 20, thus allowing the fluid and pressure to bypass back up into the tank T. This action will also occur when the fluid expands from heat sufficiently to create an excessive pressure.

After this excessive pressure has been reduced the spring 40 will force the piston P forwardly until the packing 2 again closes the port 20. It is, therefore, to be noted that a structure of this kind assures a positive means of pumping a fresh supply of fluid from the tank T into the cylinder C on the release stroke of the piston P together with positive means for releasing back into the tank T all fluid in excess of the required amount necessary to compensate for leakage and to maintain the required amount of initial pressure in the system.

It has been found in practice that a pressure of from eight to eleven pounds is required to seat the valve 11 tightly enough to form a perfect seat while the valve 16 will form a perfect seal under low pressure but will allow a little fluid to leak by under high pressure. By using both valves 11 and 16, the desired seal is obtained under both high and low pressures and as the pressure under which the valves operate varies, it is of importance to employ the two valves 11 and 16.

From the foregoing description it is thought to be obvious that a master cylinder for hydraulic brakes constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A device of the class described comprising, in combination, a cylinder, a piston working therein, a tank, a pipe line leading from the tank to the cylinder and communicating therewith in advance of the piston, said cylinder being provided in its wall with a port in communication with said pipe line, said piston closing said port when in its normally full release position, means for effecting a compression stroke of the piston within the cylinder, a second pipe line leading from the cylinder in advance of the piston, means for returning the piston to its normal release position, means permitting movement of the piston beyond its normal release position to uncover the port upon abnormal pressure in advance of the piston, and a valve interposed in the first named pipe line between the cylinder and its connection with the tank, said valve opening when the piston is in release position.

2. A device of the class described comprising, in combination, a cylinder, a piston working therein, a tank, a pipe line leading from the tank to the cylinder and communicating therewith in advance of the piston, said cylinder being provided in its wall with a port in communication with said pipe line, said piston closing said port when in its normally full release position, means for effecting a compression stroke of the piston within the cylinder, a second pipe line leading from the cylinder in advance of the piston, means for returning the piston to its normal release position, means permitting movement of the piston beyond its normal release position to uncover the port upon abnormal pressure in advance of the piston, a valve interposed in the first named pipe line between the cylinder and its connection with the tank, said valve opening when the piston is in release position, and closing under high pressure, and a second valve interposed in said first named pipe line outwardly of the first named valve, said second named valve also opening when the piston is in release position and closing under low pressure.

3. A device of the class described comprising, in combination, a cylinder, a piston working therein, a tank, a pipe line leading from the tank to the cylinder and communicating therewith in advance of the piston, said cylinder being provided in its wall with a port in communication with said pipe line, said piston closing said port when in its normally full release position, means for effecting a compression stroke of the piston within the cylinder, a second pipe line leading from the cylinder in advance of the piston, means for returning the piston to its normal release position, means permitting movement of the piston beyond its normal release position to uncover the port upon abnormal pressure in advance of the piston, a valve interposed in the first named pipe line between the cylinder and its connection with the tank, said valve opening when the piston is in release position, a cylinder extension in communication with the cylinder and with which the first named pipe line also communicates, a rod carried by the piston and extending within the cylinder extension, packing carried by said rod and in close contact with the wall of the bore of the extension, the outer end portion of the rod being provided with a bore to provide communication between the cylinder extension and cylinder, and a valve within said bore of the rod, said valve opening when the piston is on a compression stroke and closing when said piston is on a release stroke, the action of the packing carried by the rod during the release stroke of the piston creating suction within the cylinder extension.

4. A device of the class described comprising, in combination, a cylinder, a piston working therein, a tank, a pipe line leading from the tank to the cylinder and communicating therewith in advance of the piston, said cylinder being provided in its wall with a port in communication with said pipe line, said piston closing said port when in its normally full release position, means to prevent retrograde flow through the pipe line, a rock lever, a shank operatively engaged with said lever, a stem operatively engaged with the piston having a bore into which the shank extends, a sleeve engaged within the bore of the stem, the inserted end portion of the shank being provided with a head to engage the inner end of the sleeve upon outward movement of the shank, and an expansible member coacting with the shank and the stem.

5. A device of the class described comprising, in combination, a cylinder, a piston working therein, a tank, a pipe line leading from the tank to the cylinder and communicating therewith in advance of the piston, said cylinder being provided in its wall with a port in communication with said pipe line, said piston closing said port when in its normally full release position, means to prevent retrograde flow through the pipe line, a rock lever, a shank operatively engaged with said lever, a stem operatively engaged with the piston having a bore into which the shank extends, a sleeve engaged within the bore of the stem, the inserted end portion of the shank being provided with a head to engage the inner end of the sleeve upon outward movement of the shank, an expansible member coacting with the shank and the stem, and a member mounted on the shank for adjustment lengthwise thereof, said expansible member having direct engagement with said adjustable member whereby the tension of said expansible member may be regulated.

In testimony whereof I hereunto affix my signature.

CHARLES F. MATTINGLY.